(12) United States Patent
Lan et al.

(10) Patent No.: US 11,551,833 B2
(45) Date of Patent: Jan. 10, 2023

(54) MANUFACTURING METHOD OF EMBEDDED METAL MESH FLEXIBLE TRANSPARENT CONDUCTIVE FILM AND APPLICATION THEREOF

(71) Applicants: QINGDAO UNIVERSITY OF TECHNOLOGY, Shandong (CN); QINGDAO 5D INTELLIGENT ADDITIVE MANUFACTURING TECHNOLOGY CO., LTD., Shandong (CN)

(72) Inventors: Hongbo Lan, Qingdao (CN); Xiaoyang Zhu, Qingdao (CN); Quan Xu, Qingdao (CN); Jiawei Zhao, Qingdao (CN); Mingyang Liu, Qingdao (CN)

(73) Assignees: QINGDAO UNIVERSITY OF TECHNOLOGY, Qingdao (CN); QINGDAO 5D INTELLIGENT ADDITIVE MANUFACTURING TECHNOLOGY CO., LTD., Qingdao (CN)

( * ) Notice: Subject to any disclaimer, the term of this patent is extended or adjusted under 35 U.S.C. 154(b) by 227 days.

(21) Appl. No.: 16/771,392

(22) PCT Filed: Jan. 17, 2020

(86) PCT No.: PCT/CN2020/072854
§ 371 (c)(1),
(2) Date: Jun. 10, 2020

(87) PCT Pub. No.: WO2020/233160
PCT Pub. Date: Nov. 26, 2020

(65) Prior Publication Data
US 2021/0407708 A1    Dec. 30, 2021

(30) Foreign Application Priority Data
May 17, 2019 (CN) .......................... 201910412960.1

(51) Int. Cl.
*H01B 13/00* (2006.01)
*B33Y 10/00* (2015.01)
(Continued)

(52) U.S. Cl.
CPC ......... *H01B 13/0013* (2013.01); *B22F 10/10* (2021.01); *B22F 10/64* (2021.01);
(Continued)

(58) Field of Classification Search
CPC ......... H01B 1/22; H01B 5/16; H01B 13/0013
See application file for complete search history.

(56) References Cited

U.S. PATENT DOCUMENTS

2015/0216057 A1 * 7/2015 Park .................... H05K 3/207
                                                              174/255

FOREIGN PATENT DOCUMENTS

| CN | 104662619 A | 5/2015 |
| CN | 106057359 A | 10/2016 |

(Continued)

OTHER PUBLICATIONS

Lee, Hyungdong, et al. "Direct alignment and patterning of silver nanowires by electrohydrodynamic jet printing." Small 10.19 (2014): 3918-3922 (Year: 2014).*
(Continued)

*Primary Examiner* — Anthony J Zimmer
*Assistant Examiner* — Sean P. O'Keefe
(74) *Attorney, Agent, or Firm* — Oliff PLC (57) ABSTRACT

A manufacturing method of an embedded metal mesh flexible transparent electrode and application thereof; the method includes: directly printing a metal mesh transparent electrode on a rigid substrate by using an electric-field-driven jet deposition micro-nano 3D printing technology; performing conductive treatment on a printed metal mesh structure through a sintering process to realize conductivity (Continued)

of the metal mesh; respectively heating a flexible transparent substrate and the rigid substrate to set temperatures; completely embedding the metal mesh structure on the rigid substrate into the flexible transparent substrate through a thermal imprinting process; and separating the metal mesh completely embedded into the flexible transparent substrate from the rigid substrate to obtain the embedded metal mesh flexible transparent electrode. The mass production of the large-size embedded metal mesh flexible transparent electrode with low cost and high throughput by combining the electric-field-driven jet deposition micro-nano 3D printing technology with the roll-to-plane thermal imprinting technology.

6 Claims, 5 Drawing Sheets

(51) Int. Cl.
  *H01B 5/16* (2006.01)
  *B33Y 80/00* (2015.01)
  *B33Y 40/20* (2020.01)
  *B22F 10/10* (2021.01)
  *B22F 10/66* (2021.01)
  *B22F 10/64* (2021.01)

(52) U.S. Cl.
  CPC .............. *B22F 10/66* (2021.01); *B33Y 10/00* (2014.12); *B33Y 40/20* (2020.01); *B33Y 80/00* (2014.12); *H01B 5/16* (2013.01); *H01B 13/0016* (2013.01); *H01B 13/0026* (2013.01); *B22F 2301/10* (2013.01); *B22F 2301/255* (2013.01)

(56) References Cited

FOREIGN PATENT DOCUMENTS

| CN | 108859098 A | 11/2018 | | |
|---|---|---|---|---|
| CN | 110021462 A | 7/2019 | | |
| KR | 2016018896 A | * | 2/2016 | ............ G06F 3/041 |
| WO | 2006/030981 A1 | 3/2006 | | |

OTHER PUBLICATIONS

Apr. 3, 2020 International Search Report issued in International Patent Application No. PCT/CN2020/072854.

Apr. 3, 2020 Written Opinion of the International Searching Authority issued in Internationla Patent Application No. PCT/CN2020/072854.

* cited by examiner

MANUFACTURING METHOD OF EMBEDDED METAL MESH FLEXIBLE TRANSPARENT CONDUCTIVE FILM AND APPLICATION THEREOF

BACKGROUND

Technical Field

The present invention belongs to the field of flexible transparent electrodes and transparent conductive films, and particularly relates to a method for realizing the mass production of a large-size embedded metal mesh flexible transparent electrode with low cost and high throughput by combining electric-field-driven jet deposition micro-nano 3D printing with thermal imprinting.

Related Art

Information disclosed in the related art of the present invention only aims at increasing the understanding on the overall background of the present invention, and is not necessarily deemed to admit or imply in any form that the information composition has become the prior art known by those of ordinary skill in the art.

Flexible transparent electrodes/flexible transparent conductive films are very widely applied to many fields of touch screens, organic light-emitting diode (OLEDs), transparent displays, wearable equipment, transparent electric heaters, transparent antennas, EMI shielding windows, flexible thin film solar cells, smart windows, etc. Traditional flexible transparent electrode materials mainly include: metal nanowires (such as silver nanowires and copper nanowires), carbon nanotubes, graphene, conductive polymers, metal mesh, etc.

Figure 1:
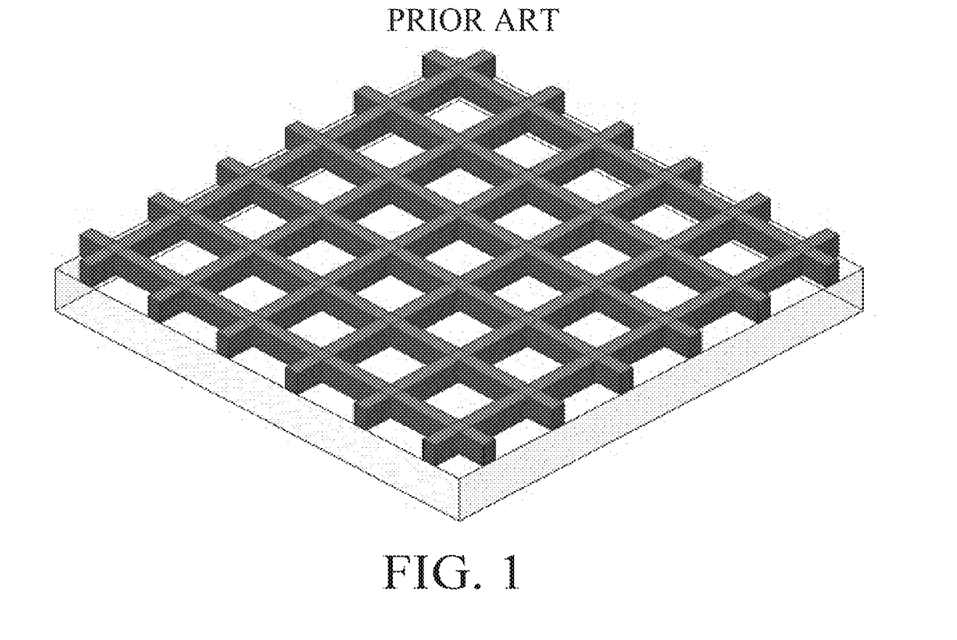
FIG. 1 is a schematic structural diagram of a traditional metal mesh transparent electrode in the related art of the present invention.

Compared with an existing flexible transparent electrode, a flexible transparent electrode based on a metal mesh has good flexibility and excellent electrical characteristics (low sheet resistance) and optical characteristics (high light transmittance). In particular, the contradiction between the low sheet resistance and the high light transmittance of the transparent electrode can be solved only by changing the line width, pitch, aspect ratio, shape and arrangement of the mesh. Electrical performance and optical performance are tailored according to actual performance requirements, so that it is guaranteed that the low sheet resistance and the high light transmittance are obtained at the same time. The flexible transparent electrode based on the metal mesh has been used for many fields and shows wide industrial application prospects. In general, the metal mesh flexible transparent electrode is obtained by forming (manufacturing) a micro-scale metal mesh (materials used include nano silver, copper, nickel, gold, etc.) on a flexible transparent substrate (base material), referring to FIG. 1. However, this flexible transparent electrode with the metal mesh adhering to a surface of the transparent substrate has many defects and deficiencies: (1) Surface smoothness is poor, and short circuiting and other defects are prone to being caused. Since the metal mesh flexible transparent electrode is on the surface of the transparent substrate, a surface of the flexible transparent electrode is uneven and unsmooth (the metal mesh has a certain thickness), which is prone to causing the defects such as short circuiting of opotoelectronic devices (OLEDs, organic photovoltaics, etc.) and causing the problems (deposition, sputtering, etc.) of difficult subsequent structure manufacturing. (2) The metal mesh has poor adhesiveness and small binding force with the substrate and is prone to falling off, especially in the application field requiring frequent bending, so that local and overall separating (falling-off or stripping) of the metal mesh from the substrate is extremely prone to being caused, which results in the failure of products or devices. (3) The metal mesh has a high sheet resistance and poor electrical performance. It is difficult to manufacture a metal mesh structure with the high aspect ratio. Especially as the line width size is decreased to be below a sub-microscale, the sheet resistance is difficult to further reduce, and the electrical performance is seriously affected and restricted. (4) Moire interference seriously affects the optical performance of the transparent electrodes. The metal mesh is on the surface of the substrate, so that the Moire interference is prone to being generated, which causes the poor optical performance. In order to solve and overcome the above defects and deficiencies, the metal mesh is embedded into the flexible transparent substrate to form an embedded metal mesh flexible transparent electrode, so that an ideal solution is provided for a high-performance metal mesh flexible transparent electrode.

However, an existing process and technology for manufacturing the embedded metal mesh flexible transparent electrode remains great challenges. It is difficult to mass produce the large-area embedded metal mesh flexible transparent electrode with high throughput and lowcost. For example, the embedded metal mesh flexible transparent electrode can be manufactured through multiple procedures such as photolithography, etching and deposition (electro-forming, chemical plating, etc.), but the manufacturing cost is extremely high, the production cycle is long, lots of waste and effluent are generated in production, and in particular, the large-area embedded metal mesh flexible transparent electrode is difficult to manufacture. Manufacturing the embedded metal mesh flexible transparent electrode by combining thermal imprinting with a scrape-coating process has the problems that the manufacturing cost is high, many procedures are needed, and a metal mesh structure with the high aspect ratio is difficult to manufacture (a structure with the large area and the high aspect ratio is difficult to demold during imprinting, and a mold and imprinted features are extremely prone to being damaged). In addition, both of the two methods further have the following deficiencies and limitations: (1) Materials of the embedded metal mesh are greatly limited, and since they are subjected to conductive post-treatment (low-temperature sintering) after the metal mesh is embedded, the sintering temperature cannot be higher than the temperature of the transparent substrate. Most existing transparent substrate materials have very poor high-temperature resistance, for example, the temperature of PET sheets cannot be higher than 100° C. in general, and the temperature of PC cannot be higher than 150° C., and therefore, the existing process can only adopt low-temperature sintered conductive materials. (2) The conductive post-treatment consumes long time, and is low in production efficiency (conductive ink is embedded in an imprinting groove). (3) In particular, a solvent of a conductive material embedded into a transparent substrate microgroove is difficult to remove completely (conductive performance is poor, and the sheet resistance is high), so that the electrical performance of the flexible transparent electrode is seriously affected.

Therefore, the inventor thinks that it is urgently needed to develop a new manufacturing technology and method so as to realize efficient and low-cost manufacturing of the large-area embedded metal mesh flexible transparent electrode, expand the available metal mesh materials, simplify a manufacturing process, improve the efficiency, lower the cost and further improve the optical performance and the electrical performance.

SUMMARY

In view of some problems in the above prior art, the present invention aims at providing a manufacturing method of an embedded metal mesh flexible transparent electrode and application thereof. The present invention realizes efficient and low-cost batched manufacturing of the large-size embedded metal mesh flexible transparent electrode by combining an electric-field-driven jet deposition micro-nano 3D printing technology with a roll-to-plane thermal imprinting technology. The method has outstanding advantages that the process is simple, the production cost is low, the method is suitable for wide material types (in particular, high-temperature metal mesh conductive materials and high-solid-content and high-viscosity conductive materials can be adopted) and suitable for various types of flexible substrates, and the flexible transparent electrode prepared by the present invention further has a quite low sheet resistance, a quite high light transmittance, etc.

The first objective of the present invention is to provide a manufacturing method of an embedded metal mesh flexible transparent electrode.

The second objective of the present invention is to provide application of the manufacturing method of the embedded metal mesh flexible transparent electrode.

In order to realize the above objectives of the invention, the present invention discloses the following technical solution:

Firstly, the present invention discloses a manufacturing method of an embedded metal mesh flexible transparent electrode, including the following steps:

(1) preparing a metal mesh transparent electrode: directly printing the metal mesh transparent electrode on a rigid substrate by using an electric-field-driven jet deposition micro-nano 3D printing technology and taking a nano-metal conductive material with a high solid content as a printing paste;

(2) performing conductive treatment on a metal mesh: performing conductive treatment on a printed metal mesh structure through a sintering process to realize conductivity of the metal mesh;

(3) embedding the metal mesh into a target flexible transparent substrate: respectively heating the flexible transparent substrate and the rigid substrate to set temperatures, and completely embedding the metal mesh structure on the rigid substrate into the flexible transparent substrate through a thermal imprinting process;

(4) separating the metal mesh from the rigid substrate: separating the metal mesh completely embedded into the flexible transparent substrate from the rigid substrate through an peel-off demolding process to obtain the embedded metal mesh flexible transparent electrode.

As a further technical solution, in step (1), the rigid substrate includes any one of a glass slide, a silicon wafer, etc. A quite high flatness is required.

As a further technical solution, in step (1), a surface of the rigid substrate needs to be subjected to surface hydrophobic pretreatment so as to reduce surface energy of the rigid substrate, and can be also coated with a hydrophobic thin film. Optionally, the hydrophobic thin film includes a polydimethylsiloxane (PDMS) thin film, a silane self-assembled film, a teflon coating, etc. with a thickness range of 200 nm to 50 μm.

As a further technical solution, in step (1), the printing paste includes, but is not limited to: a micro-nano silver conductive paste, a micro-nano copper conductive paste, a silver nanowire conductive paste, etc. A viscosity range of the printing paste is 1000 to 80000 cps.

As a further technical solution, in step (1), a printed metal mesh pattern includes, but is not limited to: various micro-nano patterns such as a wire grating, a square, a rhombus, a pyramid, a hexagon and a circle and micro-nano structures.

As a further technical solution, in step (1), main process parameters of 3D printing are a voltage of 500 to 3000 V, a distance of 50 to 500 μm between a printing head and the substrate, and a printing speed of 20 to 500 mm/s.

As a further technical solution, in step (2), the sintering process includes: low-temperature sintering, high-temperature sintering, photon sintering, laser sintering, infrared sintering, etc. A temperature range of sintering is 80 to 500° C. A matched sintering temperature and sintering time are selected according to different metal mesh materials actually used.

As a further technical solution, in step (3), the flexible transparent substrate includes, but is not limited to: any one of polyethylene terephthalate (PET), polyethylene naphthalate (PEN), polycarbonate (PC), polyvinyl chloride (PVC), polyimide (PI), polyethersulfone (PES), polyetherimide (PEI), etc.

As a further technical solution, the specific process steps of step (3) include: taking the target flexible transparent substrate, taking an elastic (flexible) material thin film (such as the PDMS thin film) as an elastic auxiliary layer (the elastic auxiliary layer can effectively reduce bubbles generated in an imprinting process and avoid voids in two sides of mesh lines to ensure complete embedding), attaching the elastic auxiliary layer to the flexible transparent substrate under a vacuum environment and avoiding generating the bubbles; and heating the rigid substrate and the flexible transparent substrate to a certain temperature (it is guaranteed that the flexible transparent substrate can generate heat deformation), rolling the flexible transparent substrate with the elastic auxiliary layer attached onto the sintered metal mesh structure through a roller, meanwhile applying a certain pressure, deforming the flexible transparent substrate by heating and completely embedding the metal mesh structure into the flexible transparent substrate.

As a further technical solution, an imprinting speed of the roller is 2 to 8 mm/s. A heating temperature of the rigid substrate is 80° C. to 300° C. A heating temperature of the flexible transparent substrate is 100° C. to 350° C.

As a further technical solution, the specific steps of step (4) include: separating the flexible transparent substrate from the rigid substrate through the "peel-off" demolding process and removing an elastic auxiliary layer. Optionally, a demolding speed is 4 to 8 mm/s.

Secondly, the present invention discloses an embedded metal mesh flexible transparent electrode prepared by the above method.

Finally, the present invention discloses application of the embedded metal mesh flexible transparent electrode and the preparation method thereof to the fields of touch screens, OLEDs, transparent displays, wearable equipment, transparent electric heaters, transparent antennas, EMI shielding windows, flexible thin film solar cells, smart windows, etc.

Compared with the prior art, the present invention achieves the following beneficial effects:

(1) The production cost is low: by combining the electric-field-driven jet deposition micro-nano 3D printing and thermal imprinting technologies, the present invention can realize the mass production of the large-size embedded metal mesh flexible transparent electrode with lowcost and high throughput, without assistance of expensive equipment of photolithography, nanoimprint lithography, etc. Moreover, the method of the present invention has a quite high utilization rate for the expensive metal mesh materials, almost approaching to 100%, without material waste (material waste is serious in processes such as a doctor blade method, and only a minute quantity of materials are utilized).

(2) The production efficiency is high: the present invention has a few process steps, each process step has a short processing time, and the production efficiency in a whole manufacturing process is high. Meanwhile, the present invention realizes efficient continuous production of the electrode by combining the roll-to-plane imprinting process.

(3) There are many kinds of suitable metal mesh materials, and there is almost no limit to the viscosity: the process of the present invention almost has no limit to materials including low-temperature sintered metal conductive ink, high-temperature sintered metal conductive ink, etc. and breaks through the defect that an existing process can only use the low-temperature sintered metal conductive ink. Besides, in the prior art, a micro-nano groove is difficultly filled with metal conductive ink with a high solid content and a high viscosity, which is only suitable for a low-viscosity material. The present invention is suitable for metal conductive ink with an ultra-high viscosity. Therefore, the process proposed by the present invention significantly expands the kind and type of applicable materials.

(4) The manufactured metal mesh has a low sheet resistance and excellent electrical performance: the present invention can manufacture the embedded metal mesh flexible transparent electrode simultaneously with the high light transmittance (more than 95%), the low sheet resistance (0.5 $\Omega/sq$) and a large area. The prior art cannot realize and reach the above technical indexes basically. This is because electric-field-driven jet deposition micro-nano 3D printing adopted by the present invention can realize manufacturing of sub-microscale and nanoscale metal meshes. The manufacturing precision of the metal mesh is greatly improved. The light transmittance of the transparent electrode is significantly increased. The manufactured transparent electrode has very excellent optical performance.

(5) The large-area (large-size) embedded metal mesh flexible transparent electrode can be manufactured: electric-field-driven jet deposition micro-nano 3D printing is adopted, so that the problem that in the prior art, since large-size micro-nano mask (photolithography) or large-size micro-nano mold (nanoimprint) manufacturing cannot be realized, a large-area (large-size) embedded metal mesh flexible transparent electrode cannot be manufactured is solved.

(6) The present invention provides an industrial-grade solving method for efficient and low-cost batched manufacturing of the large-area (large-size) embedded metal mesh flexible transparent electrode. Moreover, the manufactured transparent electrode simultaneously has the excellent optical performance and electrical performance, and has a very flat and smooth surface.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute an improper limitation to this application.

DETAILED DESCRIPTION

It should be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described in the related art, the inventor thinks that it is urgently needed to develop a new manufacturing technology and method so as to realize the mass production of a large-area embedded metal mesh flexible transparent electrode with lowcost and high throughput, extend available metal mesh materials, simplify a manufacturing process, improve the efficiency, lower the cost, and further improve optical performance and electrical performance. Therefore, the present invention provides a manufacturing method of an embedded metal mesh flexible transparent electrode. The present invention is further illustrated with reference to the drawings and the specific implementations.

Embodiment 1

Figure 2:
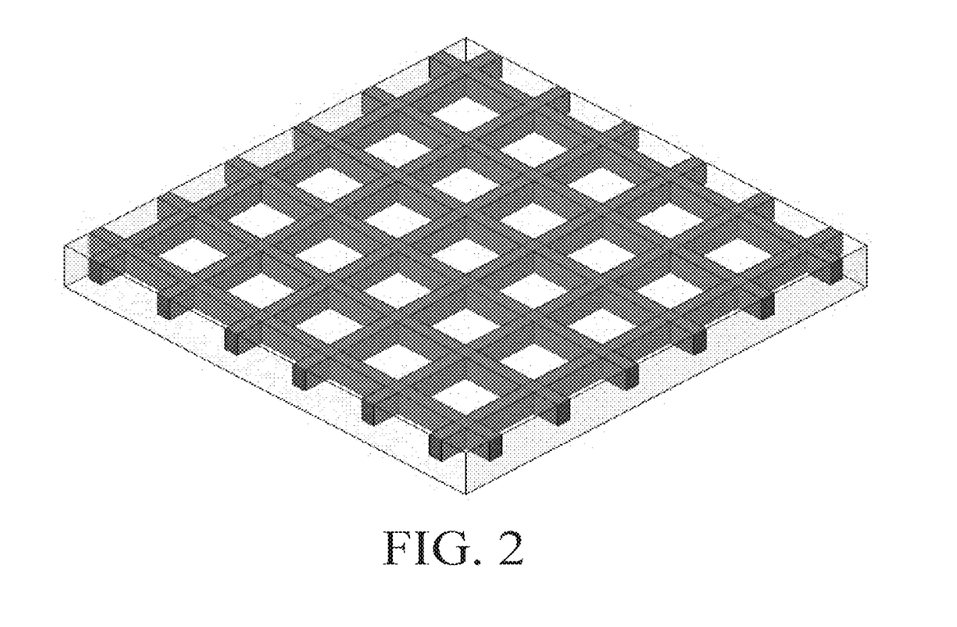
FIG. 2 is a schematic structural diagram of an embedded metal mesh transparent electrode prepared in Embodiments 1 to 4 of the present invention.
Figure 3:
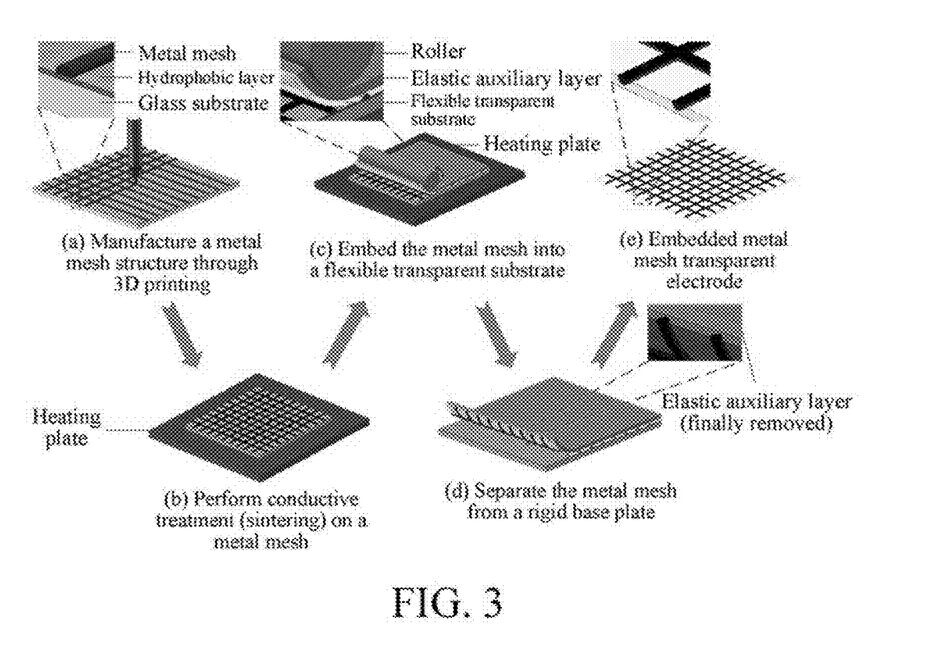
FIG. 3 is a schematic principle diagram of the embedded metal mesh flexible transparent electrode prepared in Embodiments 1 to 4 of the present invention.
Figure 4:
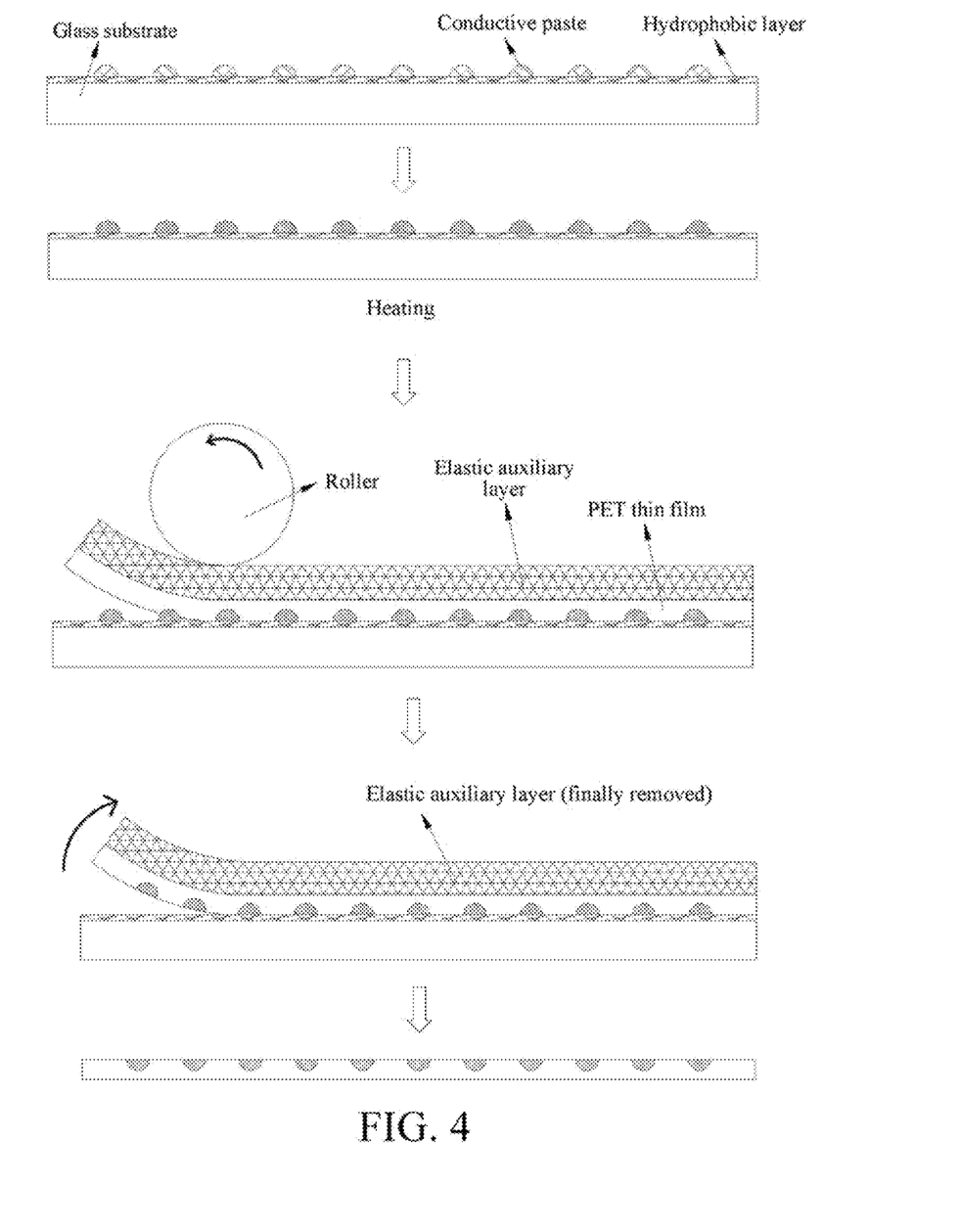
FIG. 4 is a flow chart of a process for preparing the embedded metal mesh flexible transparent electrode prepared in Embodiments 1 to 4 of the present invention.

Referring to FIGS. 2 to 4, a manufacturing method of an embedded metal mesh flexible transparent electrode includes the following steps:

Step 1: A large-area metal mesh structure is manufactured through electric-field-driven jet deposition micro-nano 3D printing:

(1) A common glass slide is taken as a base plate/substrate. The common glass slide is cleaned and dried, and then a surface of the common glass slide is coated with a PDMS thin film with a thickness of 10 μm through a spin-coating method. A PDMS liquid is solidified for 20 min under a heating environment of 80° C. to make PDMS form a film to form a hydrophobic layer, so that a printing base plate is obtained. The hydrophobic layer can reduce adhesive force between a printed metal mesh and the base plate, which facilitates subsequent separating of the metal mesh embedded into a flexible transparent substrate from the base plate. Meanwhile, the hydrophobic layer can increase an aspect ratio of the printed metal mesh, so that a light transmittance of the subsequent embedded metal mesh is increased conveniently. The PDMS liquid used is Sylgard 184 of Dow Corning.

Figure 5:
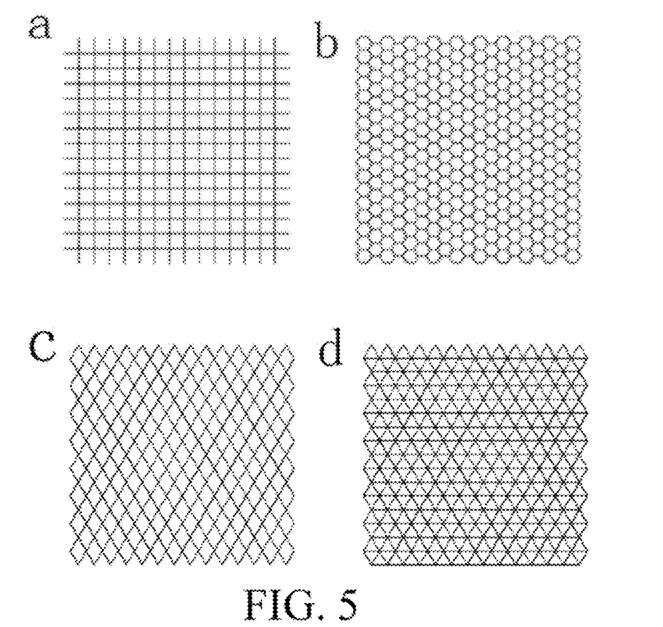
FIG. 5 is geometrical shapes of several kinds of metal mesh structures adopted in Embodiments 1 to 4 of the present invention, wherein FIG. a indicates Embodiment 1, FIG. b indicates Embodiment 2, FIG. c indicates Embodiment 3, and FIG. d indicates Embodiment 4.

(2) A nano silver conductive paste (with a viscosity of 50000 cps and a silver content of 70%) is selected as a printing material. A square nano silver metal mesh structure (referring to FIG. 5a) is printed on the base plate through electric-field-driven jet deposition micro-nano 3D printing according to a designed and determined transparent electrode structure to obtain a large-area conductive metal mesh. Printing parameters are as follows: a voltage of 1000 V, a height of 150 μm between a printing head and the base plate and a printing speed of 20 mm/s. Parameters of the metal mesh are as follows: an area of 200 mm×200 mm of an effective pattern region, a line width of 2 μm, a pitch of 10 μm and an aspect ratio of 0.8.

Step 2: Conductive treatment is performed on the metal mesh: the printed metal mesh is placed into a heating furnace. The nano silver conductive paste is sintered and solidified at a sintering temperature of 135° C. for a sintering time of 40 min.

Step 3: The metal mesh is embedded into the flexible transparent substrate through roll-to-plane thermal imprinting:

(1) A PET thin film sheet with a size of 250 mm×250 mm and a thickness of 200 μm is taken, and a PDMS thin film with the same size and with a thickness of about 2 mm is manufactured as an elastic auxiliary layer. The PDMS thin film and a PET thin film are attached under a vacuum environment to obtain a PDMS-PET composite structure, which avoids generating bubbles.

(2) The rigid base plate with the metal mesh printed is placed at 100° C. The PDMS-PET composite structure is rolled onto the sintered metal mesh structure (an imprinting speed is 4 mm/s) in a line contact mode through a heating roller (with a temperature of 110° C.). Meanwhile, a certain pressure (an imprinting force is 30 kgf) is applied. The PET thin film is heated to deform, and the metal mesh structure is embedded into the PET thin film.

Figure 6:
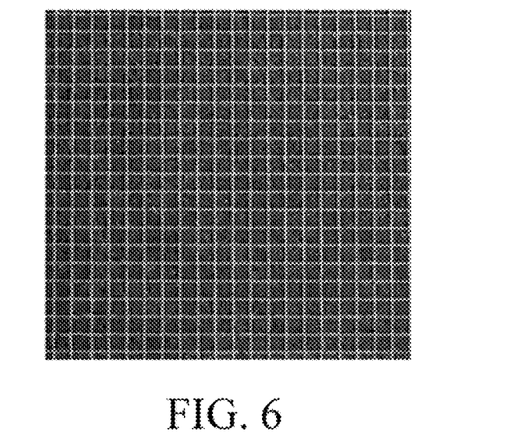
FIG. 6 is a real object diagram of an embedded metal mesh flexible transparent electrode prepared in Embodiment 1 of the present invention.

Step 4: The metal mesh embedded into the flexible transparent substrate is separated from the rigid base plate: the flexible transparent substrate is separated from the rigid base plate through a "peel-off" demolding process, and a demolding speed is 6 mm/s. Then, the PDMS elastic auxiliary layer is removed to obtain an embedded flexible transparent electrode (referring to FIG. 6), so that the large-area high-performance embedded flexible transparent electrode is manufactured.

Embodiment 2

Referring to FIGS. 2 to 4, a manufacturing method of an embedded metal mesh flexible transparent electrode includes the following steps:

Step 1: A large-area metal mesh structure is manufactured through micro-nano 3D printing:

(1) A silicon wafer of 8 inches is taken as a base plate/substrate. The silicon wafer is cleaned and then soaked in a heptadecafluorodecyl trichlorosilane+isooctane solution for 10 min to form a self-assembled film (hydrophobic layer) with a thickness of about 200 nm, so that a printing base plate is obtained. The hydrophobic layer can reduce adhesive force between a printed metal mesh and the base plate, which facilitates subsequent separating of the metal mesh embedded into a flexible transparent substrate from the base plate. Meanwhile, the hydrophobic layer can increase an aspect ratio of the printed metal mesh, so that the sheet resistance of the subsequent embedded metal mesh can be decreased without sacrificing light transmittance. A PDMS liquid used is Sylgard 184 of Dow Corning.

(2) A nano silver conductive paste (with a viscosity of 60000 cps and a silver content of 80%) is selected as a printing material. A hexagonal nano silver metal mesh structure (referring to FIG. 5b) is printed on the base plate through an electric-field-driven jet deposition micro-nano 3D printing technology according to a designed micro-nano graphic mesh structure to obtain a large-area conductive metal mesh. Printing parameters are as follows: a voltage of 800 V, a distance of 150 μm between a printing head and the base plate and a printing speed of 40 mm/s. Parameters of the metal mesh are as follows: an area of 120 mm×120 mm of an effective pattern region, a hexagon side length of 5 μm, a line width of 500 nm and an aspect ratio of 0.5.

Step 2: Conductive treatment is performed on the metal mesh: the printed metal mesh is placed into a heating environment. The nano silver conductive paste is sintered and solidified. As for the nano silver conductive paste used in this time, a sintering temperature is 135° C., and a sintering time is 40 min.

Step 3: The metal mesh is embedded into the flexible transparent substrate through roll-to-plane thermal imprinting:

(1) A PEN thin film with a size of 150 mm×150 mm and a thickness of 100 μm is taken, and a PDMS thin film with the same size and with a thickness of about 2 mm is manufactured as an elastic auxiliary layer. The PDMS thin film and the PEN thin film are attached under a vacuum environment to obtain a PDMS-PEN composite structure, which avoids generating bubbles.

(2) The rigid base plate with the metal mesh printed is placed at 150° C. The PDMS-PEN composite structure is rolled onto the sintered metal mesh structure (an imprinting speed is 6 mm/s) in a line contact mode through a heating roller (with a temperature of 170° C.). Meanwhile, a certain pressure (an imprinting force is 30 kgf) is applied. The PEN thin film is heated to deform, and the metal mesh structure is embedded into the PEN thin film.

Figure 7:
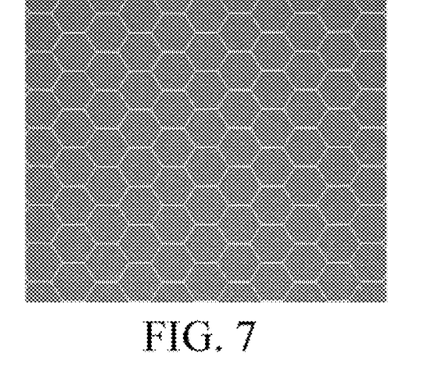
FIG. 7 is a real object diagram of an embedded metal mesh flexible transparent electrode prepared in Embodiment 2 of the present invention.

Step 4: The metal mesh embedded into the flexible transparent substrate is separated from the rigid base plate: the flexible transparent substrate is separated from the rigid base plate through a "peel-off" demolding process, and a demolding speed is 6 mm/s. Then, the PDMS elastic auxiliary layer is removed to obtain an embedded flexible transparent electrode (referring to FIG. 7), so that the large-area high-performance embedded flexible transparent electrode is manufactured.

Embodiment 3

Referring to FIGS. 2 to 4, a manufacturing method of an embedded metal mesh flexible transparent electrode includes the following steps:

Step 1: A large-area metal mesh structure is manufactured through electric-field-driven jet deposition micro-nano 3D printing:

(1) A common glass slide is taken as a base plate/substrate. The common glass slide is cleaned and dried, and then a surface of the common glass slide is coated with a PDMS thin film with a thickness of 50 μm through a spin-coating method. A PDMS liquid is solidified for 20 min under a heating environment of 80° C. to make PDMS form a film to form a hydrophobic layer, so that a printing base plate is obtained. The hydrophobic layer can reduce adhesive force between a printed metal mesh and the base plate, which facilitates subsequent separating of the metal mesh embedded into a flexible transparent substrate from the base plate. Meanwhile, the hydrophobic layer can increase an aspect ratio of the printed metal mesh, so that a light transmittance of the subsequent embedded metal mesh is increased conveniently. The PDMS liquid used is Sylgard 184 of Dow Corning.

(2) A nano silver conductive paste (with a viscosity of 80000 cps and a silver content of 80%) is selected as a printing material. A rhombic nano silver metal mesh structure (referring to FIG. 5c) is printed on the base plate through electric-field-driven jet deposition micro-nano 3D printing according to a designed and determined transparent electrode structure to obtain a large-area conductive metal mesh. Printing parameters are as follows: a voltage of 3000 V, a distance of 500 μm between a printing head and the base plate and a printing speed of 200 mm/s. Parameters of the metal mesh are as follows: an area of 150 mm×150 mm of an effective pattern region, a line width of 1 μm, a pitch of 10 μm and an aspect ratio of 0.6.

Step 2: Conductive treatment is performed on the metal mesh: the printed metal mesh is placed into a heating furnace. The nano silver conductive paste is sintered and solidified at a sintering temperature of 500° C. for a sintering time of 5 min.

Step 3: The metal mesh is embedded into the flexible transparent substrate through roll-to-plane thermal imprinting:

(1) A PC thin film with a size of 200 mm×200 mm and a thickness of 200 μm is taken, and a PDMS thin film with the same size and with a thickness of about 2 mm is manufactured as an auxiliary layer. The PDMS thin film and the PC thin film are attached under a vacuum environment to obtain a PDMS-PC composite structure, which avoids generating bubbles.

(2) The rigid base plate with the metal mesh printed is placed at 160° C. The PDMS-PC composite structure is rolled onto the sintered metal mesh structure (an imprinting speed is 2 mm/s) in a line contact mode through a heating roller (with a temperature of 180° C.). Meanwhile, a certain pressure (an imprinting force is 35 kgf) is applied. The PC thin film is heated to deform, and the metal mesh structure is embedded into the PC thin film.

Figure 8:
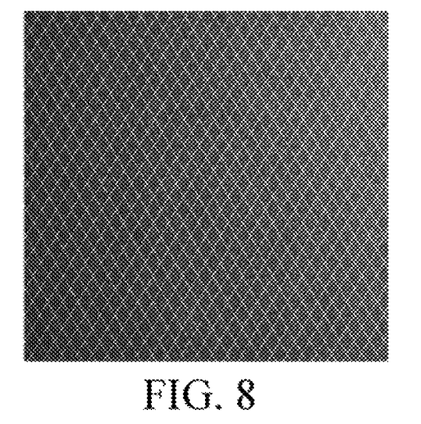
FIG. 8 is a real object diagram of an embedded metal mesh flexible transparent electrode prepared in Embodiment 3 of the present invention.

Step 4: The metal mesh embedded into the flexible transparent substrate is separated from the rigid base plate: the flexible transparent substrate is separated from the rigid base plate through a "peel-off" demolding process, and a demolding speed is 4 mm/s. Then, the PDMS elastic auxiliary layer is removed to obtain an embedded flexible transparent electrode (referring to FIG. 8), so that the large-area high-performance embedded flexible transparent electrode is manufactured.

Embodiment 4

Referring to FIGS. 2 to 4, a manufacturing method of an embedded metal mesh flexible transparent electrode includes the following steps:

Step 1: A large-area metal mesh structure is manufactured through electric-field-driven jet deposition micro-nano 3D printing:

(1) A silicon wafer of 6 inches is taken as a base plate/substrate. The silicon wafer is cleaned and then soaked in a heptadecafluorodecyl trichlorosilane+isooctane solution for 10 min to form a self-assembled film (hydrophobic layer) with a thickness of about 200 nm, so that a printing base plate is obtained. The hydrophobic layer can reduce adhesive force between a printed metal mesh and the base plate, which facilitates subsequent separating of the metal mesh embedded into a flexible transparent substrate from the base plate. Meanwhile, the hydrophobic layer can increase an aspect ratio of the printed metal mesh, so that a light transmittance of the subsequent embedded metal mesh is increased conveniently.

(2) A nano silver conductive paste (with a viscosity of 1000 cps and a silver content of 70%) is selected as a printing material. A triangular nano silver metal mesh structure (referring to FIG. 5d) is printed on the base plate through electric-field-driven jet deposition micro-nano 3D printing according to a designed and determined transparent electrode structure to obtain a large-area conductive metal mesh. Printing parameters are as follows: a voltage of 500 V, a distance of 50 μm between a printing head and the base plate and a printing speed of 500 mm/s. Parameters of the metal mesh are as follows: an area of 100 mm×100 mm of an effective pattern region, a triangle side length of 10 μm, a line width of 1 μm, a pitch of 20 μm and an aspect ratio of 0.5.

Step 2: Conductive treatment is performed on the metal mesh: the printed metal mesh is placed into a heating furnace. The nano silver conductive paste is sintered and solidified at a sintering temperature of 80° C. for a sintering time of 30 min.

Step 3: The metal mesh is embedded into the flexible transparent substrate through roll-to-plane thermal imprinting:

(1) A transparent PI thin film with a size of 150 mm×150 mm and a thickness of 300 μm is taken, and a PDMS thin film with the same size and with a thickness of about 2 mm is manufactured as an elastic auxiliary layer. The PDMS thin film and the PI thin film are attached under a vacuum environment to obtain a PDMS-PI composite structure, which avoids generating bubbles.

(2) The rigid base plate with the metal mesh printed is placed at 300° C. The PDMS-PI composite structure is rolled onto the sintered metal mesh structure (an imprinting speed is 8 mm/s) in a line contact mode through a heating roller (with a temperature of 350° C.). Meanwhile, a certain pressure (an imprinting force is 35 kgf) is applied. The PI thin film is heated to deform, and the metal mesh structure is embedded into the PI thin film.

Figure 9:
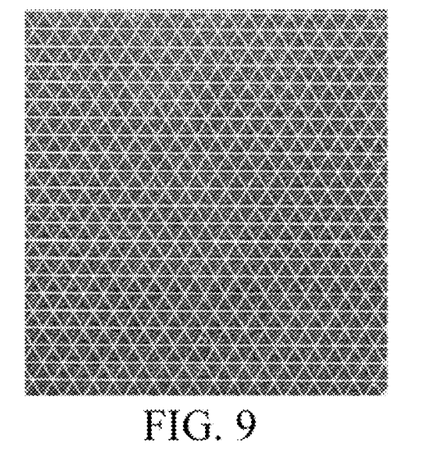
FIG. 9 is a real object diagram of an embedded metal mesh flexible transparent electrode prepared in Embodiment 4 of the present invention.

Step 4: The metal mesh embedded into the flexible transparent substrate is separated from the rigid base plate: the flexible transparent substrate is separated from the rigid base plate through a "peel-off" demolding process, and a demolding speed is 8 mm/s. Then, the PDMS elastic auxiliary layer is removed to obtain an embedded flexible transparent electrode (referring to FIG. 9), so that the large-area high-performance embedded flexible transparent electrode is manufactured.

Performance test: A sheet resistance and a light transmittance of the embedded flexible transparent electrode prepared in Embodiments 1 to 4 of the present invention are tested, and results are shown in Table 1.

TABLE 1

|  | Sheet resistance(Ω/sq) | Light transmittance(%) |
|---|---|---|
| Embodiment 1 | 0.5 | 96.4 |
| Embodiment 2 | 0.3 | 95.7 |
| Embodiment 3 | 0.3 | 95.9 |
| Embodiment 4 | 0.4 | 96.2 |

It can be seen from Table 1 that the present invention can manufacture the embedded metal mesh flexible transparent electrode simultaneously with a high light transmittance (more than 95%), a low sheet resistance (0.5 Ω/sq) and a large area (400 mm×400 mm). This is because electric-field-driven jet deposition micro-nano 3D printing adopted by the present invention can make a conductive paste form a Taylor cone shape under comprehensive effects of an electric field force, a surface tension, a viscous force and an air pressure, and an ultra-fine cone jet is formed during jetting, so that sub-microscale and nanoscale metal meshes are manufactured. The manufacturing precision of the metal meshes is greatly improved. The light transmittance of the transparent electrode is significantly increased. The manufactured transparent electrode has very excellent optical performance.

The foregoing descriptions are merely preferred embodiments of this application, but are not intended to limit this application. A person skilled in the art may make various alterations and variations to this application. Any modification, equivalent replacement, or improvement made without departing from the spirit and principle of this application shall fall within the protection scope of this application.

What is claimed is:

1. A manufacturing method of an embedded metal mesh flexible transparent electrode, comprising the following steps:
 (1) preparing a metal mesh transparent electrode: directly printing the metal mesh transparent electrode on a rigid substrate by using an electric-field-driven jet deposition micro-nano 3D printing technology and taking a nano-metal conductive material as a printing paste;
 (2) performing conductive treatment on a metal mesh: performing conductive treatment on a printed metal mesh structure through a sintering process to realize conductivity of the metal mesh;
 (3) embedding the metal mesh into a target flexible transparent substrate: comprising taking the target flexible transparent substrate, taking an elastic or flexible material thin film as an auxiliary layer, attaching the auxiliary layer to the flexible transparent substrate under a vacuum environment and avoiding generating bubbles; and heating the rigid substrate and the flexible transparent substrate, rolling the flexible transparent substrate with the elastic auxiliary layer attached onto the sintered metal mesh structure through a roller, meanwhile applying a pressure, deforming the flexible transparent substrate by heating and completely embedding the metal mesh structure into the flexible transparent substrate; and
 (4) separating the metal mesh from the rigid substrate: separating the metal mesh completely embedded into the flexible transparent substrate from the rigid substrate through a peel-off demolding process to obtain the embedded metal mesh flexible transparent electrode;
 wherein the thermal imprinting process adopts a roll-to-plane micro-nano imprinting process, and
 in step (1), either
  a surface of the rigid substrate is subjected to a surface hydrophobic pretreatment to form a hydrophobic thin film with a thickness of is 200 nm to 50 μm, or
  the surface of the rigid substrate is coated with a hydrophobic thin film that has a thickness range of 200 nm to 50 μm.

2. The manufacturing method according to claim 1, wherein the hydrophobic thin film comprises a polydimethylsiloxane thin film, a silane self-assembled film or a teflon coating.

3. The manufacturing method according to claim 1, wherein in step (1), the printing paste comprises: a micro-nano silver conductive paste, a micro-nano copper conductive paste or a silver nanowire conductive paste.

4. The manufacturing method according to claim 1, wherein in step (3), the flexible transparent substrate comprises: any one of polyethylene terephthalate, polyethylene naphthalate, polycarbonate, polyvinyl chloride, polyimide, polyethersulfone and polyetherimide.

5. The manufacturing method according to claim 1, wherein the specific steps of step (4) comprise: separating the flexible transparent substrate from the rigid substrate through the peel-off demolding process and removing an elastic auxiliary layer.

6. The manufacturing method according to claim 1, wherein in step (1), a printed metal mesh pattern comprises: any one or more of a wire grating, a square, a rhombus, a pyramid, a hexagon and a circle.

* * * * *